July 7, 1953 S. G. ESKIN ET AL 2,644,640
THERMOSTATIC CONTROL DEVICE
Filed June 8, 1951 4 Sheets-Sheet 3

INVENTORS
Samuel G. Eskin and
Adele M. Arkelyan.
BY Albert J. Henderson
THEIR ATTORNEY INVENTORS
Samuel G. Eskin and
BY Adele M. Arkelyan.

THEIR ATTORNEY

Patented July 7, 1953

2,644,640

UNITED STATES PATENT OFFICE 2,644,640

THERMOSTATIC CONTROL DEVICE

Samuel G. Eskin, Pittsburgh, Pa., and Adele M. Arkelyan, Los Angeles, Calif., assignors to Robertshaw-Fulton Controls Company, Greensburg, Pa., a corporation of Delaware Application June 8, 1951, Serial No. 230,612

15 Claims. (Cl. 236—21)

The present invention relates to fuel control devices for fluid fuel burners and more specifically to fuel control devices including a thermostatically controlled valve and a main shut-off valve.

In devices of this type, it has long been the practice to provide a single manually operable control member for setting the temperature to which the thermostatically controlled valve will respond and for manipulating the main shut-off valve between closed and open positions. However, in such devices, the temperature setting means and the shut-off valve have both been directly connected to the single control member in such a manner that any movement of the control member necessarily effected movement of both, each temperature setting therefore corresponded to a particular position of the shut-off valve between its closed and full-open position. This arrangement is objectionable in that the shut-off valve has a throttling effect on the fuel stream in a number of the temperature settings, a condition which is extremely undesirable in many applications. The throttling effect has been successfully eliminated in some devices by utilizing a plug valve as the main shut-off valve, providing an arcuate groove in the seating surface of the plug member and connecting the arcuate groove with the fluid passage within the plug. However, such a groove reduces the seating area of the plug member and if the unit is to pass a large volume of gas, the groove must be relatively large and will so reduce the seating area that an inadequate seal is provided thereby. Accordingly, in applications where large capacity is required and throttling is not permissible, it has been necessary to utilize separate manually operable control members for setting the temperature to which the thermostatically controlled valve will respond and for manipulating the shut-off valve between closed and full-open positions.

It is a principal object of this invention to accomplish the setting of the temperature to which the thermostatically controlled valve will respond and the operation of the shut-off valve between controlling positions by manipulation of a single control element without throttling the fuel stream throughout the range of temperature settings.

Another object of this invention is to effect opening of the main shut-off valve by rotation of a control member through a given angular displacement and thereafter effecting the setting of the temperature to which the thermostatically controlled valve will respond by further rotation of the control member.

Another object of this invention is to connect the shut-off valve with the control member in only a limited range of angular positions thereof.

Another object is to release the control member from the shut-off valve after the valve is in full-open position to permit further rotation and temperature setting action of the control member.

In the preferred embodiment of this invention, the control member is operatively connected to an adjusting element of the thermostatically controlled valve and a releasable connection between the control member and the shut-off valve is arranged to be effective only within a limited range of angular positions of the control member, the control member being free to rotate relative to the shut-off valve outside such limited range of angular positions.

Other objects and advantages will appear from the following specification taken in connection with the accompanying drawings wherein.

Figure 1:
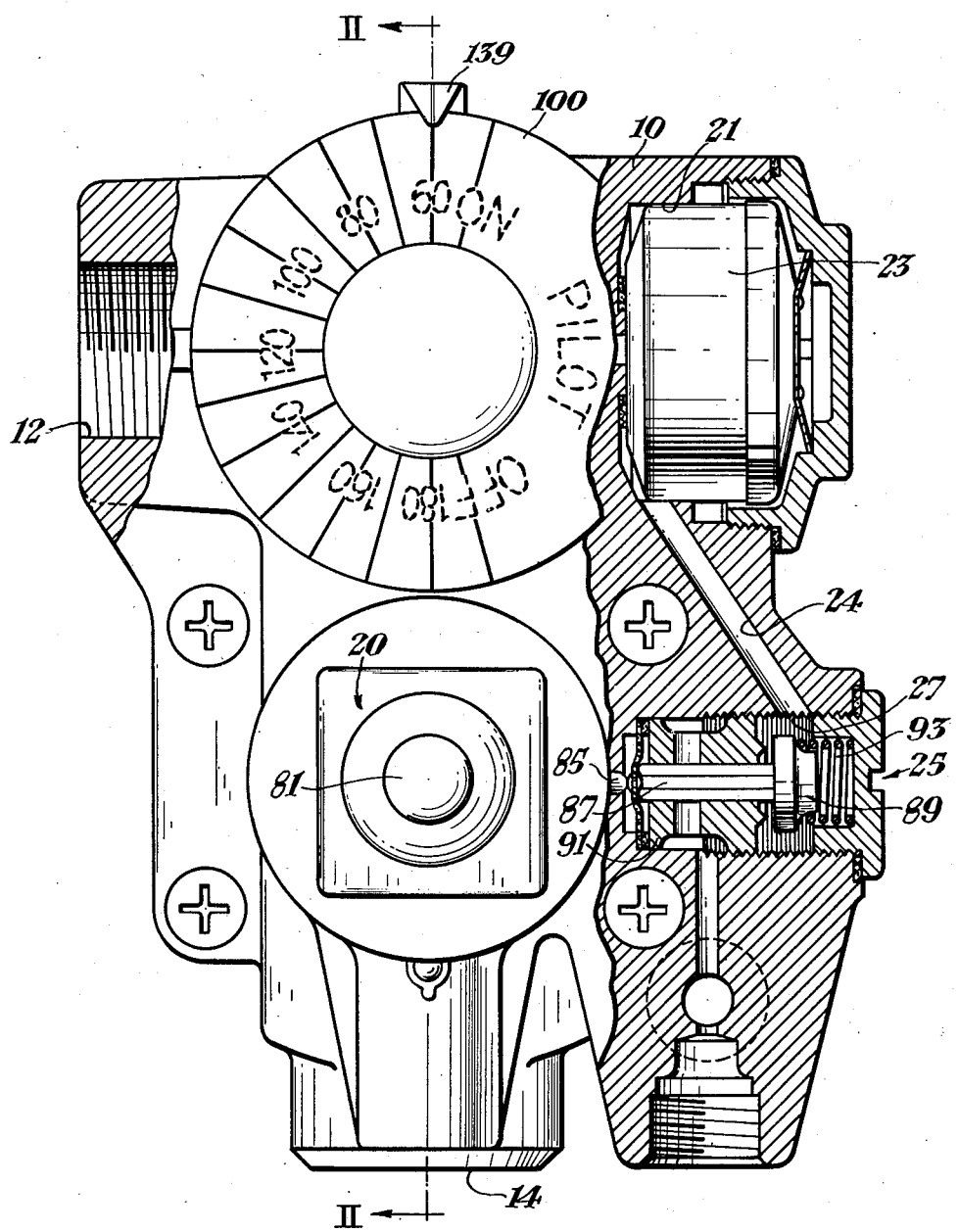
Fig. 1 is a plan view of a fluid fuel control device embodying this invention with a portion thereof shown in section.
Figure 2:
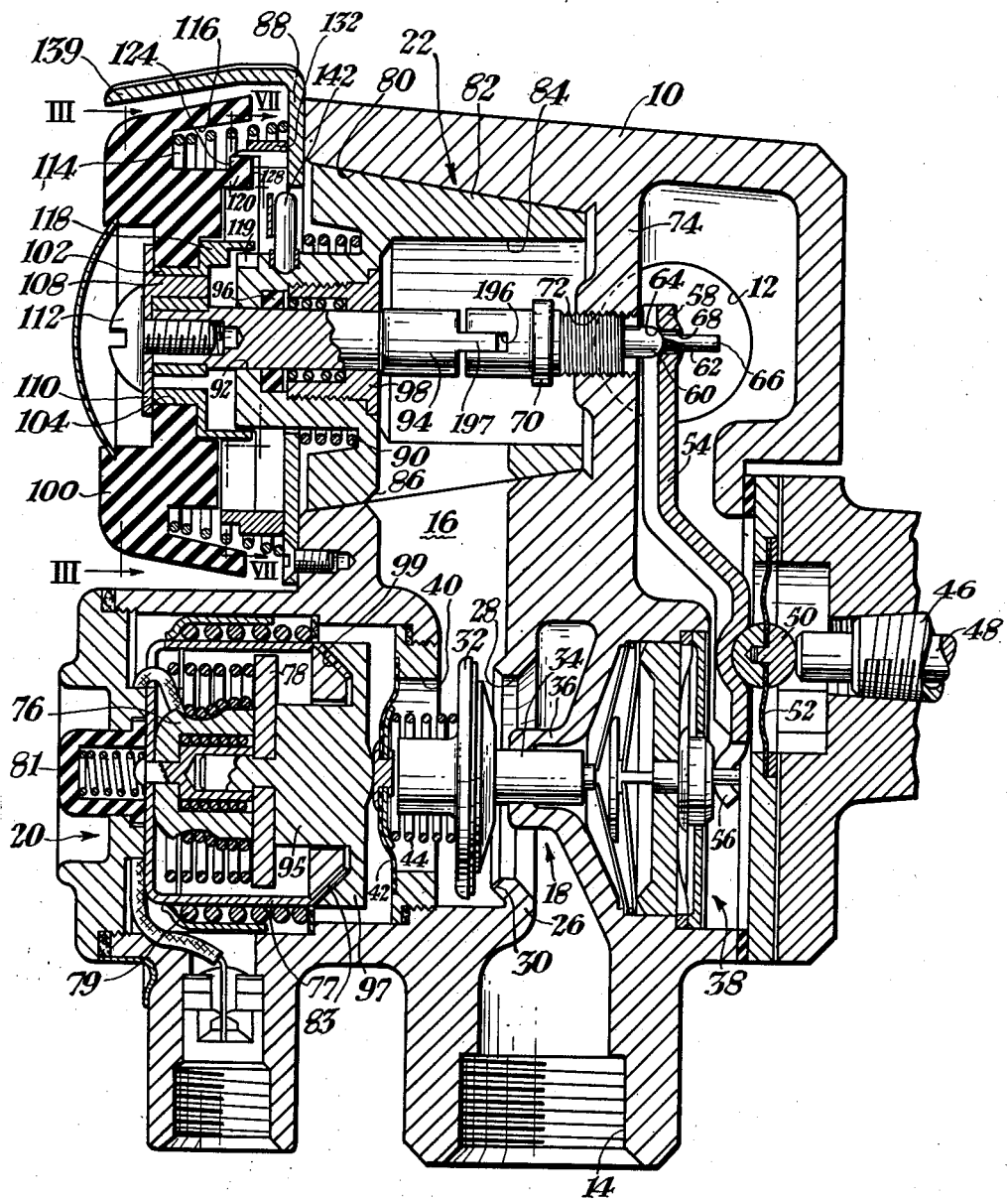
Fig. 2 is a sectional view taken on the line II—II of Fig. 1.
Figure 3:
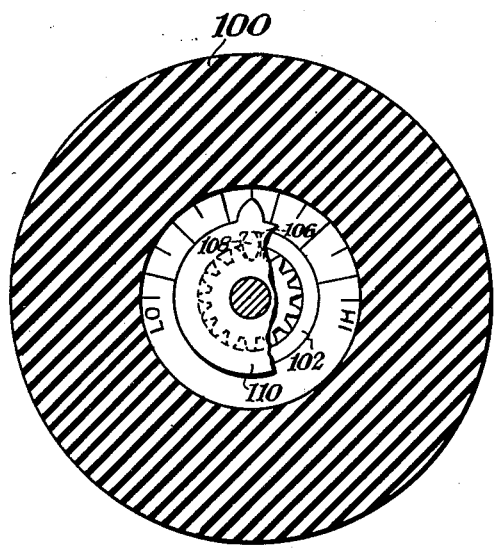
Fig. 3 is a sectional view taken on the line III—III of Fig. 2.
Figures 4, 5:
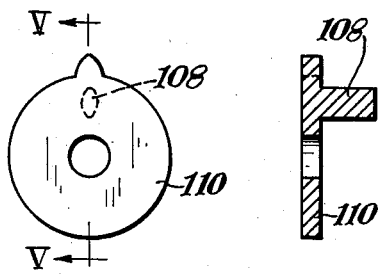
Fig. 4 is a plan view of a detail.
Fig. 5 is a sectional view taken on the line V—V of Fig. 4.

Referring to Figs. 1 and 2, the control device structure comprises a casing 10 provided with an inlet 12 and an outlet 14 connected by a main fuel passage 16. The flow of fluid fuel in the passage 16 is under the control of a thermostatically controlled valve 18 which may have associated therewith a safety shut-off device 20 operable in response to a predetermined condition for preventing flow of fuel through the passage 16. Interposed in the passage 16 between the inlet 12 and the thermostatically controlled valve 18 is a main shut-off valve 22 which is movable between positions for controlling the flow of fuel in the passage 16. The main shut-off valve 22 may also control the flow of fuel to a filter chamber 21 containing a filter 23 and communicating with an auxiliary passage 24 formed in the casing 10 which in turn communicates with the inlet of the valve chamber 27 of a pilot valve 25 controlling the flow of fuel to a pilot burner (not shown).

The pilot valve 25 may be operatively associated with the safety shut-off device 20 as will more fully appear.

The thermostatically controlled valve 18 may be of any suitable form and is here shown as comprising a partition 26 traversing the passage 16 and having a port 28 formed therein. A valve seat 30 formed on the partition 26 around the port 28 is cooperable with a reciprocable valve member 32 to close the port 28. The valve member 32 is mounted on a valve stem 34 journaled in a suitable guide 36 and extending into engagement with a snap-action mechanism of a type well known in the art indicated generally by the reference numeral 38. Valve and snap-action mechanisms of the type shown in the drawings is shown and described in Reissue Patent No. 22,987.

An aperture 40 coaxial with the valve member 32 is formed in the casing 10 and is closed by a flexible diaphragm 42 having its peripheral portion secured in fluid sealing relation with the casing 10 by any suitable means. Interposed between the diaphragm 42 and the valve member 32 is a spring 44 for biasing the valve member 32 toward the valve seat 30.

Thermally responsive actuating means is provided for moving the valve member 32 between controlling positions and may include a thermal element of the rod and tube type with a tube 46 of expansible material secured to the casing 10 and a rod 48 of relatively non-expansive material extending into the casing 10 and being free to move relative thereto.

The free end of the rod 48 is in engagement with a bearing element 50 carried by a diaphragm seal 52 and the bearing element 50 in turn abuts a lever 54 intermediate the ends thereof. One end 56 of the lever 54 operatively engages the snap-action mechanism 38 and the other end 58 of the lever 54 is seated on an adjustable fulcrum element 60. The fulcrum element 60 is provided with a spherical bearing surface 62 which engages a complementary seat 64 formed in the end 58 of the lever 54. Supported on and coaxial with the fulcrum element 60 is a pintle 66 which extends through an aperture 68 formed in the lever 54. The fulcrum element 60 is carried by a rotatable adjusting element 70 threaded into an aperture 72 formed in a spider 74 which is carried by the casing 10 and disposed within the passage 16.

It will be apparent to those skilled in the art that rotation of the adjusting element 70 relative to the casing 10 will effect axial movement thereof to adjust the fulcrum 60 through a range of positions and that the temperature at which the rod and tube thermal element 46, 48 will cause actuation of the snap-action mechanism 38 and valve member 32 will be determined by the position of the fulcrum member 60. Since temperature setting and actuating mechanisms for thermostatically controlled valves of the type herein disclosed are well known in the art a detailed description of the operation thereof is deemed unnecessary.

The safety shut-off device 20 may be of any known type and is here shown as comprising an electromagnet 76 having associated therewith an armature 78 movable toward and away from the magnet 76 and biased toward the valve member 32 to be effective in its released position to so increase the bias of the spring 44 as to maintain the valve member 32 in engagement with the valve seat 30. The armature 78 is ineffective to hold the valve member 32 closed when retained in its attracted position as shown in Fig. 2.

The magnet 76 is here shown as being movable relative to the valve 32 for resetting the armature 78 in attracted position and for positioning the auxiliary valve means 25 in fuel flow permitting position. More particularly, the magnet 76 is mounted in a magnet cover 77 slidably carried in the casing 10 in axial alignment with the valve member 32 and biased away from the valve member 32 by a coil spring 79 acting between the casing 10 and the magnet cover 77. The magnet cover 77 is provided at one end with a push button 81 and at the other end with a cam surface 83 engageable with a movable follower 85 which abuts one end of a valve stem 87 on which is mounted the pilot valve member 89 of the pilot valve 25. The pilot valve member 89 is biased toward a ported valve seat 91 by a spring 93 and when in engagement therewith, prevents flow of fuel through the pilot valve chamber 27 to the pilot burner (not shown).

Depending from the armature 78 is an armature stem 95 provided with a flanged end portion 97, one face 99 of which is complementary with the cam surface 83. The flanged end portion 97 is so spaced from the armature 78 that the face 99 engages the cam surface 83 when the armature 78 is in the attracted position for a purpose which will more fully appear.

In resetting the safety shut-off device 20, the push button 81 is depressed and the magnet 76 is moved against the bias of the spring 79 toward the valve member 32 and into engagement with the armature 78. Such movement causes the follower 85 to ride up the cam surface 83 and be moved laterally of the magnet 76 to position the pilot valve member 89 away from its seat 91 in fuel flow permitting position. When the resetting operation is complete and the magnet 76 returns to its initial position under the bias of the spring 79, the armature 78 is carried along in its attracted position and the face 99 is retained in engagement with the cam surface 83 thus preventing the follower 85 from riding down the cam surface 83 and the follower is retained in its laterally extended, pilot valve opening position. Upon deenergization of the magnet 76, the armature 78 is released and the flanged portion 97 of the armature stem 95 moves away from the cam surface 83 permitting the follower 85 to move laterally toward the axis of the magnet 76 and the pilot valve member 89 moves into engagement with the valve seat 91 to cut off the pilot burner fuel supply.

Safety shut-off means for the thermostatically controlled valve and auxiliary valve of the type herein disclosed is fully disclosed and claimed in the copending patent application of Michael J. Caparone and Charles M. Vaughn, Serial No. 226,506, filed May 15, 1951.

The main shut-off valve 22 is here shown as being of the plug type and comprises a tapered valve seat 80 formed in the casing 10 for receiving a plug valve member 82. The valve member 82 is provided with an angular passage 84, one end of which is in constant communication with the inlet 12 and the other end of which forms an opening 86 in the side of the valve member 82. The opening 86 is adapted to be closed by the surface of the valve seat 80 in one position of the valve member 82, to register with the opening to the pilot filter chamber 21 in another position of the valve member 82 to provide a "pilot" position and to register with the passage 16 and the opening to the pilot filter chamber 21 in still another position of the valve member 82 to provide a full-open or "on" position in a manner well known in the art. Interposed between the valve member 82 and a cover plate 88 secured to the casing 10 is a spring 90 which serves to bias the valve member 82 against the valve seat 80 sufficiently to establish a fluid sealing but rotatable relation therebetween.

Rotatably mounted in a bore 92 formed in the valve member 82 along the axis thereof is a shaft 94 which extends into the passage 84 and into engagement with the adjusting element 70. A slot 196 formed in the adjusting element 70 slidingly receives a rectangular extension 197 of the shaft 94 to provide a slidable torque transmitting connection between the shaft 94 and the adjusting element 70. Rotation of the shaft 94 may thus produce rotational and consequent axial movement of the adjusting element 70 without corresponding axial movement of the shaft 94. Leakage through the bore 92 is prevented by a suitable seal here shown as a packing ring 96 which encircles the shaft 94 and is compressed by a spring-loaded gland 98.

To provide for rotation of the shaft 94, a rotatable control element or knob 100 is affixed to that end of the shaft 94 which extends out of the valve member 82. As best shown in Figs. 2, 3, 4 and 5, the knob 100 is mounted upon the shaft 94 to be rotatable therewith and movable axially thereof through a limited distance. To effect such mounting a sleeve 102 is pressed into a bore 104 formed in the knob 100 and is provided on its inner periphery with a keyway 106. The free end of the shaft 94 is splined to receive a key 108 which also extends into the keyway 106 to prevent relative rotation between the knob 100 and the shaft 94.

The key 108 is formed integral with and depends from an apertured plate 110 which is secured on the end of the shaft 94 by a screw 112. The plate 110 extends beyond the edges of the bore 104 formed in the knob 100 and the knob 100 is biased toward the plate by a spring 114 acting between the knob 100 and the cover plate 88. The knob 100 is provided on its underside with an annular groove 116 for receiving an end of the spring 114.

When the knob 100 is retained by the spring 114 in its biased position bearing against the plate 110, the knob 100 and its associated shaft 94 are free to rotate relative to the valve member 82. However, clutch means is provided for establishing a torque transmitting relation between the knob 100 and the valve member 82 when the knob 100 is moved axially of the shaft 94 against the bias of the spring 114 to a depressed position. The clutch means may take the form of a single clutch tooth 118 secured to the sleeve 102 on the underside of the knob 100 to be movable therewith into a complementary recess 119 formed in the valve member 82, engagement of the clutch tooth 118 with the walls of the recess 119 being effective to establish a positive driving connection between the knob 100 and the valve member 82 when the knob 100 is in its depressed position.

Figure 6:
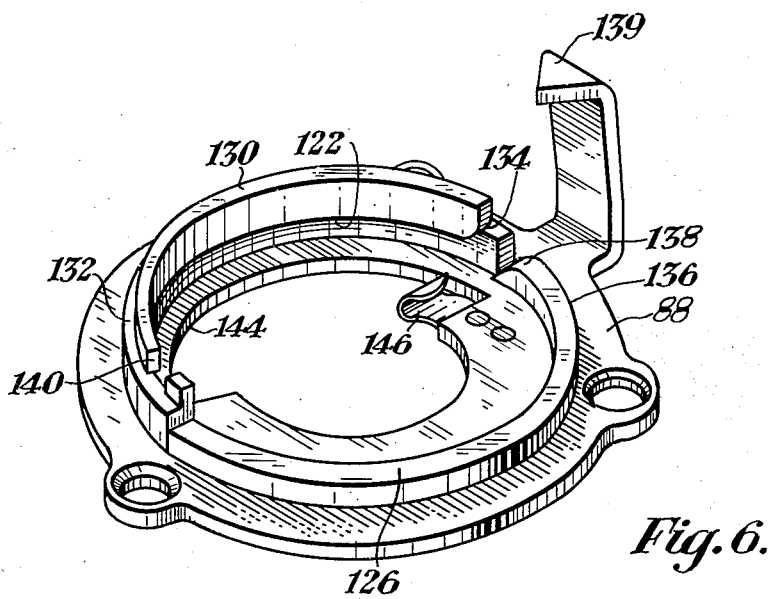
Fig. 6 is an isometric view of a detail.

It is desirable that a torque transmitting relation be maintained between the knob 100 and the valve member 82 in dependence upon the angular position of the knob 100. To this end, a cam element or follower 120 is formed on the underside of the knob 100 and projecting radially outward into the angular groove 116 for cooperation with cam surfaces formed on the cover plate 88. As best shown in Figs. 2 and 6, a first cam surface 122 adapted for engagement with the upper face 124 of the follower 120, is provided on the cover plate 88 for retaining the knob 100 in its depressed position with the spring 114 compressed. A second cam surface 126, adapted for engagement with the lower face 128 of the follower 120, is provided on the cover plate 88 for maintaining the knob 100 in its biased position.

The cam surface 122 may comprise the underside of an arcuate element 130 carried by a semicircular element 132 in turn secured by any suitable means such as welding or the like to the cover plate 88. The elements 130, 132 are concentric with the shaft 94 and the radius of the inner peripheral wall of the arcuate element 130 is less than the radius of the inner peripheral wall of the semi-circular element 132 so that the element 130 is in effect offset radially inward of the element 132 to expose a portion of the lower surface thereof which comprises the cam surface 122. One corner of the element 130 is beveled at 134 for a purpose which will appear hereinafter.

The cam surface 126 comprises the top surface of a semi-circular element 136 mounted on the cover plate 88 with the ends thereof abutting the ends of the semi-circular element 132. The semi-circular element 136 is concentric with the shaft 94 and the radius of its inner peripheral wall is equal to the radius of the inner peripheral wall of the arcuate element 130. A corner of the element 136 is beveled at 138 for a purpose which will appear hereinafter.

Figure 8:
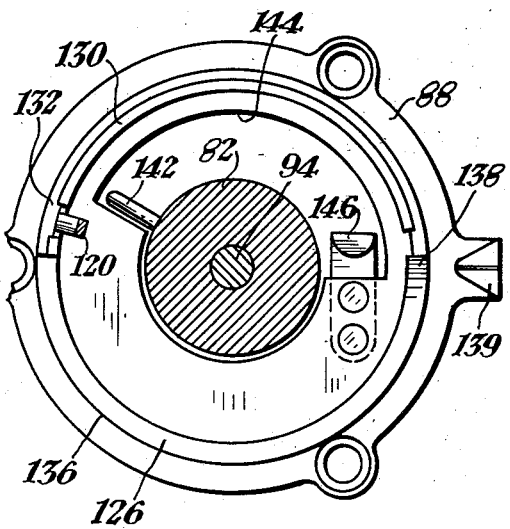
Figs. 8, 9 and 10 are views similar to Fig. 7 showing other operating positions of the parts.
Figure 9:
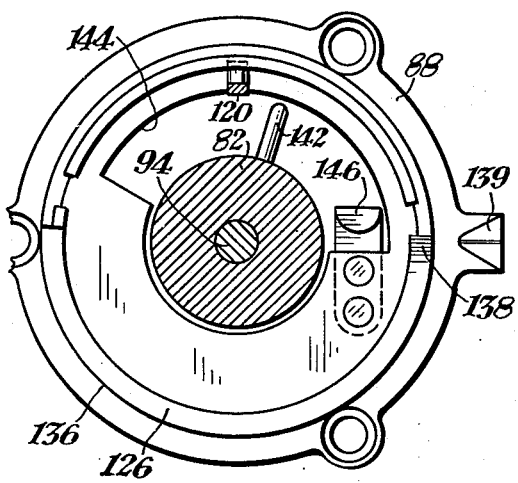

The knob 100 is so oriented with regard to the valve member 82 that when the valve member 82 is in fuel flow preventing position, appropriate indicia on the knob is aligned with a pointer 139 carried by the cover plate 88 and the cam follower 120 is disposed immediately adjacent the end face 140 of the arcuate element 130, the knob 100, of course, being in its biased position. This relation of the various parts is best shown in Fig. 8. To effect rotation of the knob 100, the knob must first be moved against the bias of the spring 114 so that the follower 120 will clear the end face 140 of the element 130. When the knob 100 is depressed and rotated clockwise as viewed in Figs. 1 and 3, the follower 120 will be positioned with the upper face 124 thereof in engagement with the cam surface 122, as shown in Fig. 9, and the knob 100 will be retained in its depressed position.

As hereinbefore pointed out, when the knob 100 is in its depressed position, the clutch tooth 118 is disposed within the recess 119 formed in the valve member 82 to provide a positive drive connection between the knob 100 and the valve member 82. It will thus be apparent that throughout the range of angular movement of the knob 100 through which the follower 120 is in engagement with the cam surface 122, the torque transmitting relation between the knob and the valve member 82 will be maintained. Preferably, this range of angular movement is the range through which the valve member 82 must be rotated in moving from closed to full-open position. When the knob 100 is rotated beyond the aforementioned range of angular movement, the follower 120 will follow the beveled edges 134, 138 and ride up on the cam surface 126 of the element 136 to position the knob 100 in its biased position and move the clutch tooth 118 out of the recess 119 to terminate the clutched relation between the knob 100 and the valve member 82.

To positively limit the range of angular movement of the valve member 82 to the range between its closed and full-open positions, interlocking means is provided on the valve member 82 and the cover plate 88. This means may take the form of a pin 142 having one end rigidly secured to the valve member 82 and extending radially outward into an arcuate slot 144 formed in the cover plate 88, the end walls of the slot 144 being adapted to abut the pin 142 in the closed and full-open positions of the valve member respectively.

Latching means in the form of a spring clip 146 carried by the cover plate 88 engages the pin 142 in the full-open position of the valve member 82 to preclude movement of the valve member 82 upon further manipulation of the knob 100. Forces transmitted from the shaft 94 to the valve member 82 by reason of the frictional engagement of the packing ring 96 with the shaft and the valve member are thus overcome and rendered ineffective to cause movement of the valve member.

Operation

Assuming that the knob 100 is in the "Off" position and it is desired to set the various parts of the device in operating positions, the knob 100 is depressed and rotated to the "Pilot" position wherein fuel is supplied to the pilot filter chamber 21 but not to the main passage 16. As hereinbefore pointed out, such movement of the knob 100 against the bias of the spring 114 and rotation thereof will cause simultaneous movement of the valve member 82 because of the torque transmitting relation established by the clutch tooth 118 and the recess 119. The position of the valve member 82 and the follower 120 are now as shown in Fig. 9 and the safety shut-off device may be reset in the manner hereinbefore described.

Figure 10:
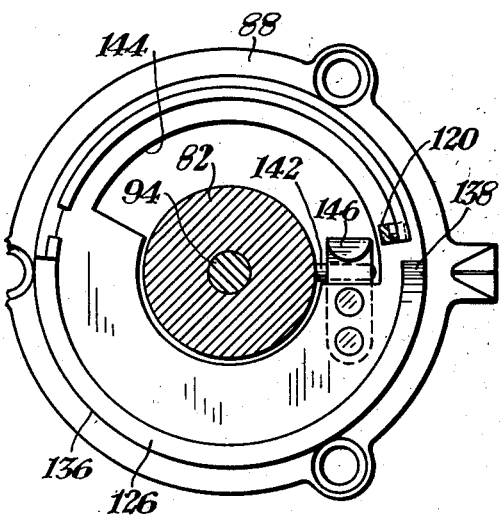

The knob 100 is now rotated to the "on" position to locate the valve member 82 in the full-open position as shown in Fig. 2. Fuel can now flow from the inlet 12 through the passage 84 in the valve member 82 to the main passage 16 where control of such flow to the outlet 14 is effected by the thermostatically controlled valve 18. The valve member 82 and the follower 120 are now in the positions shown in Fig. 10, the pin 142 being firmly held by the spring clip 146 in abutting relation with one end of the arcuate groove 144 and the follower 120 positioned on the bevel 134.

Figure 7:
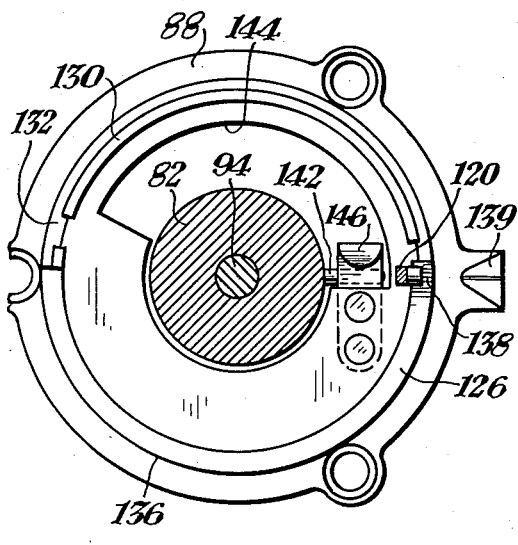
Fig. 7 is a sectional view taken on the line VII—VII of Fig. 2.

Further rotation of the knob 100 in a clockwise direction will cause the follower 120 to ride up the bevel surface 138 as shown in Fig. 7, the knob 100 moving to its biased position and disengaging the clutch tooth 118 from the recess 119. The valve member 82 now remains in its full open or "on" position and the knob 100 with its associated shaft 94 is free to rotate relative to the valve member to effect rotation of the adjusting element 70 for setting the temperature to which the thermostatically controlled valve member 32 will respond.

If the temperature to which the thermostatically controlled valve 18 will respond has been set at some high point and it is desired to reduce the temperature setting, the knob 100 is rotated in a counterclockwise direction and the frictional engagement of the packing ring 96 with the shaft 94 and the valve member 82 will tend to rotate the valve member in a counterclockwise direction. The valve member 82 is, however, prevented from turning by the spring clip 146 which firmly grips the pin 142. No movement of the valve member 82 can occur until the follower 120 is forced under the cam surface 122 and the knob 100 is thereby depressed to establish a clutched relation between the valve member 82 and the knob 100.

Since the valve member 82 is retained in its full open position during the temperature setting operation, it will be apparent from the foregoing that the setting of the temperature to which the thermostatically operated valve will respond and the operation of the shut-off valve between controlling positions is accomplished by manipulation of the single control element without throttling the fuel stream throughout the range of temperature settings.

It will also be obvious to those skilled in the art that the illustrated embodiment of this invention may be variously changed and modified, or features thereof, singly or collectively, embodied in other combinations than that illustrated without departing from the spirit of the invention or sacrificing all of the advantages thereof, and that accordingly the disclosure herein is illustrative only and the invention is not limited thereto.

It is claimed and desired to secure by Letters Patent:

1. In a control device for fluid fuel burners having main shut-off valve means rotatable between open and closed positions for controlling the supply of fuel to the burner, a thermostatically controlled valve for controlling the supply of fuel to the burner, and a rotatable adjusting element for setting the temperature to which the thermostatically controlled valve will respond, the combination of a rotatable control element operatively connected to the adjusting element for transmitting rotational movement thereto, connection means for transmitting rotational movement from said control element to the shut-off valve means and moving the latter between said positions, and means for rendering said connection means ineffective upon movement of the shut-off valve means to said open position to thereby free said control element for further rotation relative to the shut-off valve means for setting said adjusting element in selected positions.

2. A control device as claimed in claim 1 wherein means is provided for securing the shut-off valve against rotational movement while said connection means is ineffective.

3. In a control device for fluid fuel burners having a thermostatically controlled valve for controlling the supply of fuel to the burner and a rotatable adjusting element for setting the temperature to which the thermostatically controlled valve will respond, the combination of main shut-off valve means having a valve member rotatable between positions for controlling the flow of fuel to the burner, a rotatable control element operatively connected to the adjusting element for transmitting rotational movement thereto, clutch means operatively associated with said shut-off valve member and said control element, and means for sequentially conditioning said clutch means to establish and terminate a torque transmitting relation between said control element and said shut-off valve member upon rotation of said control element, said control element being free to rotate relative to said valve member after termination of said torque transmitting relation.

4. A control device as claimed in claim 3 wherein means is provided for securing said shut-off valve member against rotational movement substantially simultaneously with the termination of said torque transmitting relation.

5. In a control device for fluid fuel burners, having a thermostatically controlled valve for controlling the supply of fuel to the burner and a rotatable adjusting element for setting the temperature to which the thermostatically controlled valve will respond, the combination of a main shut-off valve for controlling the flow of fuel to the burner, said shut-off valve having a valve member rotatable between fuel flow permitting and fuel flow preventing positions, a rotatable control element reciprocable between positions along its axis of rotation and operatively connected to the adjusting element for transmitting rotational movement thereto, a clutch member operatively connected to said valve member, a second clutch member operatively connected to said control element, said clutch members being maintained in operative engagement with each other in one of said positions of said control element and out of engagement with each other in another of said position of said control element, means for positioning said control element in said one position over a selected range of angular positions thereof, and means for positioning said control element in said other position over a second selected range of angular positions thereof.

6. A control device as claimed in claim 5 wherein means is provided for securing said valve member in said fuel flow permitting position while said control element is disposed within said second range.

7. In a control device for fluid fuel burners having a thermostatically controlled valve for controlling the supply of fuel to the burner and a rotatable adjusting element for setting the temperature to which the thermostatically controlled valve will respond, the combination of a main shut-off valve for controlling the flow of fuel to the burner, said shut-off valve having a valve member rotatable between fuel flow preventing and fuel flow permitting positions, a rotatable control element operatively connected to the adjusting element for transmitting rotational movement thereto, said control element being reciprocable between positions along its axis of rotation and being biased to one of said positions, a clutch member carried by said valve member, a second clutch member carried by said control element, said clutch members being maintained out of engagement with each other while said control element is in said biased position and in operative engagement with each other while said control element is in another of said positions, and cam means for overcoming said bias and positioning said control element in said other position through a selected range of angular movement thereof whereby rotation of said control element through said selected range will effect movement of said valve member between said fuel flow preventing and fuel flow permitting positions, said cam means being constructed and arranged to position said control element in said biased position through a second selected range of angular movement thereof.

8. A control device as claimed in claim 7 wherein means is provided for securing said valve member against rotation when said control element is disposed within said second range.

9. A control device as claimed in claim 8 wherein means is provided for preventing movement of said control element to said other position while said control member is in said second range.

10. A control device for fluid fuel burners comprising a casing having an inlet and an outlet, thermally responsive valve means in said casing for controlling the flow of fuel between said inlet and outlet, a rotatable adjusting element carried by said casing laterally of said thermally responsive valve means and operatively connected thereto for setting the temperature to which said thermally responsive valve means will respond, main valve means in said casing for controlling the flow of fuel between said inlet and outlet, said main valve means having a valve member rotatable between fuel flow preventing and fuel flow permitting positions and axially aligned with said adjusting element, a shaft journaled in said valve member and operatively connected to said adjusting element, a knob mounted on said shaft to be movable axially thereof but restrained from rotational movement relative thereto, said knob being biased away from said valve member to a first position, a projection on the underside of said knob adapted to be engageable with a recess formed in said valve member when said knob is moved against said bias to a second position, a cam element carried by said knob, and a cam surface on said casing adapted to be cooperable with said cam element for selectively positioning said knob in one of said positions in dependence upon the angular disposition thereof.

11. A control device as claimed in claim 10 wherein an extension on said valve member extends into a recess formed in said casing to limit the rotation of said valve member.

12. A control device as claimed in claim 11 wherein latching means carried by said casing cooperates with said extension in the fuel flow permitting position of said valve member.

13. In a fuel control device for fluid fuel burners, the combination of a casing with a passage for fluid fuel therethrough, thermally responsive valve means for controlling the flow of fuel through said passage, a rotatable adjusting element for setting the temperature to which said thermally responsive valve means will respond, main valve means for controlling the flow of fuel through said passage, said main valve means having a valve member disposed in said passage to be rotatable between fuel flow preventing and fuel flow permitting positions, a rotatable control element operatively connected to said adjusting element for transmitting rotational movement thereto, clutch means operatively associated with said valve member and said control element, and means for sequentially conditioning said clutch means to establish and terminate a torque transmitting relation between said control element and said valve member upon rotation of said control element, said control element being free to rotate relative to said valve member after termination of said torque transmitting relation, and interengaging means on said casing and said valve member for limiting the rotation of said valve.

14. A control device as claimed in claim 13 wherein said interengaging means comprises an extension of said valve member cooperable with a recess formed in said casing.

15. A control device as claimed in claim 14 wherein latching means carried by said casing cooperate with said extension in the fuel flow permitting position of said valve member.

SAMUEL G. ESKIN.
  ADELE M. ARKELYAN.

References Cited in the file of this patent

UNITED STATES PATENTS

| Number | Name | Date |
|---|---|---|
| 2,011,691 | Schoenfeld | Aug. 20, 1935 |
| 2,198,896 | Wetzel | Apr. 30, 1940 |
| 2,302,407 | Waddell | Nov. 17, 1942 |